(12) United States Patent
Shin

(10) Patent No.: US 7,784,989 B2
(45) Date of Patent: Aug. 31, 2010

(54) LED BACKLIGHT UNIT INCLUDING LIGHT GUIDE PLATE WITH FIXING MEANS

(75) Inventor: Chang Ho Shin, Seoul (KR)

(73) Assignee: Samsung LED Co. Ltd., Gyunggi-Do (KR)

( * ) Notice: Subject to any disclaimer, the term of this patent is extended or adjusted under 35 U.S.C. 154(b) by 249 days.

(21) Appl. No.: 11/708,037

(22) Filed: Feb. 20, 2007

(65) Prior Publication Data

US 2007/0195551 A1  Aug. 23, 2007

(30) Foreign Application Priority Data

Feb. 21, 2006  (KR) .................. 10-2006-0016702

(51) Int. Cl.
*F21V 7/10* (2006.01)

(52) U.S. Cl. .............. 362/628; 362/612; 362/633; 362/634; 349/62; 349/65

(58) Field of Classification Search .......... 362/612, 362/621, 628; 349/62, 65
See application file for complete search history.

(56) References Cited

U.S. PATENT DOCUMENTS

| | | | |
|---|---|---|---|
| 4,903,172 A * | 2/1990 | Schoniger et al. .......... 362/612 |
| 5,327,328 A * | 7/1994 | Simms et al. .............. 362/26 |
| 5,618,096 A | 4/1997 | Parker et al. |
| 5,727,862 A | 3/1998 | Wu |
| 5,803,573 A | 9/1998 | Osawa et al. |
| 6,036,328 A * | 3/2000 | Ohtsuki et al. ............. 362/612 |
| 6,065,845 A * | 5/2000 | Miyazaki ................... 362/26 |
| 6,512,557 B1 | 1/2003 | Miwa |
| 6,874,900 B2 * | 4/2005 | Hsieh ...................... 362/26 |
| 7,139,048 B2 * | 11/2006 | Han et al. .................. 349/62 |
| 2005/0207178 A1 * | 9/2005 | Parker ...................... 362/612 |
| 2005/0237757 A1 * | 10/2005 | Weng ....................... 362/494 |
| 2005/0259444 A1 | 11/2005 | Choi |
| 2006/0050532 A1 * | 3/2006 | Stadtwald-Klenke ....... 362/612 |
| 2006/0104086 A1 | 5/2006 | Ura |
| 2006/0158901 A1 * | 7/2006 | Wang ....................... 362/612 |
| 2007/0008739 A1 * | 1/2007 | Kim et al. .................. 362/612 |

(Continued)

FOREIGN PATENT DOCUMENTS

CN  2618249 Y  5/2004

(Continued)

OTHER PUBLICATIONS

United Kingdom Office Action issued in United Kingdom Patent Application No. GB0702610.7, mailed May 24, 2007.

(Continued)

*Primary Examiner*—Ismael Negron
(74) *Attorney, Agent, or Firm*—McDermott Will & Emery LLP

(57) ABSTRACT

An LED backlight unit has a substrate, a plurality of light emitting diodes disposed on the substrate, and a light guide plate is placed adjacent to the light source. A chassis fixes the light source and the light guide plate therein. Fixing means engagingly fit a side of the light guide plate into the light source plate and chassis with the substrate of the light source is fixed in surface contact with the chassis. The light guide plate is assemblable without a thermosetting adhesive.

8 Claims, 7 Drawing Sheets

U.S. PATENT DOCUMENTS

2007/0076433 A1* 4/2007 Kinoshita et al. ........... 362/615
2007/0127261 A1* 6/2007 An et al. .................... 362/608

FOREIGN PATENT DOCUMENTS

DE     296 20 817 U1    3/1997
JP      2005-037814      2/2005
WO    WO 2004/027315 A1    4/2004

OTHER PUBLICATIONS

German Office Action issued in Patent Application No. 10 2007 006 303.4-51 dated on Jun. 4, 2008.
Chinese Office Action, with English translation, issued in Chinese Patent Application No. CN 2007100789008, mailed Jan. 16, 2009.

* cited by examiner

LED BACKLIGHT UNIT INCLUDING LIGHT GUIDE PLATE WITH FIXING MEANS

CLAIM OF PRIORITY

This application claims the benefit of Korean Patent Application No. 2006-16702 filed on Feb. 21, 2006 in the Korean Intellectual Property Office, the disclosure of which is incorporated herein by reference.

BACKGROUND OF THE INVENTION

1. Field of the Invention

The invention relates to a backlight unit using a light emitting diode, and more particularity, to a light emitting diode (LED) backlight unit in which a light guide plate is assembled without a thermosetting adhesive affecting brightness of the LED, and which assures higher radiation efficiency of heat generated from the LED, thereby maintaining high brightness, and significantly enhancing productivity.

2. Description of the Related Art

Development in the electronic device industry also has led to development in various small display devices with less energy consumption rate, and in image devices, computers and telecommunication terminals using such display devices. A liquid crystal display (LCD) emerged in line with this trend and has been highlighted as a display device for monitors and mobile telecommunication terminals.

In general, the LCD fails to generate light voluntarily, which thus necessitates a backlight unit including a light source for generating light and a light guide plate on a rear side of the LCD panel.

The backlight unit generates a white light so that the LCD panel produces an image in almost true-to-life color.

FIG. 1 illustrates a conventional backlight unit 100 using a light emitting diode (LED). The light emitting diode (LED) used in the conventional backlight unit 100 generates light by virtue of luminescence (electroluminescence) arising when voltage is applied to a semiconductor.

The LED is smaller in size and longer in useful life than the conventional light source. Also, the LED as a light source exhibits high energy efficiency and low driving voltage due to direct conversion of electrical energy into optical energy.

Therefore, in the backlight unit 100 with these merits, as shown in FIG. 1, a light source 120, a light guide plate 130, a plurality of diffuser sheets 140 and a plurality of prism sheets 150 are disposed inside a bottom chassis 110 and fixed by a middle chassis 160 and a mold frame 162.

The light source 120 includes a substrate with superior heat radiation properties (MCPCB) 122 and a plurality of light emitting diodes 124. Here, the LEDs 124 are arranged in rows on the substrate 122 and electrically connected to an external power voltage (not illustrated).

The light guide plate 130 is of a flat type and made of a transparent acryl. The light guide plate 130 is linear at one side which is placed adjacent to the light source 120. The light guide plate 130 receives light generated from the LEDs of the light source 120 and diffuses the light through an entire top surface thereof. A reflective film (not illustrated) is fixedly disposed on an underside surface of the light guide plate 130 to induce light only toward the top surface of the light guide plate 130.

The diffuser sheets 140 are structured of a flat sheet type in the same manner as the light guide plate 130, and disposed on the light guide plate 130. The diffuser sheets 140 serve to uniformly diffuse light that propagated through the light guide plate 130.

Further, the prism sheets 150 disposed on the diffuser sheets 140 induce light from the diffuser sheets 140 into a predetermined area (image forming area) of an LCD panel (not illustrated) located thereover.

Meanwhile, as described above, the substrate 122 having a plurality of LEDs 124 disposed thereon is fastened onto a lower chassis 110 via a thermosetting adhesive 112 as shown in FIGS. 2 and 3.

That is, in the conventional backlight unit 100, the light source 112 is fastened onto the lower chassis 110 via the thermosetting adhesive 112 to be fixedly positioned with respect to the light guide plate 130.

Also, in order to prevent the guide light plate 130 from impacting the LEDs 124 of the light source 120, an attachment 114 is disposed at both sides in an inner periphery of the lower chassis 110 thereby to prevent the light guide plate 130 from being pushed toward the LEDs 124.

In consequence, light emitted from the LEDs 124 of the light source 120 is radiated outside through the light guide plate 130 and then the diffuser sheets 140 and the prism sheets 150.

However, in the conventional backlight unit 100, the LEDs 124 of the light source 120 start to radiate heat just when emitting light, thus greatly undermining brightness of the LEDs 124. Accordingly, the LEDs 124, if incapable of radiating heat smoothly after being ignited, is gradually reduced in brightness thereby not attaining desired high brightness.

In order to ensure such heat radiation effects, the LEDs are disposed on the substrate 122 to radiate heat outside effectively. Yet, the thermosetting adhesive 12 through which the substrate 122 is fastened to the lower chassis 110 considerably degrades heat radiation effects.

What is more, the substrate, if warped, can not be spaced adequately from the light guide plate 130 in the warped portion, thereby not achieving desired high brightness.

In addition, during an assembling process, the thermosetting adhesive 112 should be applied on a rear side of the substrate 122. Here, the thermosetting adhesive, if applied in an inappropriate amount, may be smeared on the LEDs 124, resultantly blocking light from the LEDs 124.

Besides, the thermosetting adhesive 112 is applied on the substrate 122 through a very intricate and tedious process, thereby adversely affecting productivity.

SUMMARY OF THE INVENTION

The present invention has been made to solve the foregoing problems of the prior art and therefore an aspect of the present invention is to provide an LED backlight unit in which a light guide plate is assembled without a thermosetting adhesive, thereby significantly enhancing productivity.

Another aspect of the invention is to provide an LED backlight unit with higher light emitting efficiency, in which heat generated from the LED is radiated outside effectively to maintain desired high brightness.

According to an aspect of the invention, the LED backlight unit includes a light source having a substrate and a plurality of light emitting diodes disposed on the substrate; a light guide plate placed adjacent to the light source; a chassis for fixing the light source and the light guide plate therein; fixing means for engagingly fitting a side of the light guide plate into the light source and chassis, wherein the substrate of the light source is fixed in surface contact with the chassis.

Preferably, the fixing means includes a plurality of protrusions protruded from the light guide plate; and a plurality of holes perforated in the light source and the chassis, respectively, corresponding to the protrusions.

Preferably, each of the protrusions includes a linear portion inserted into each of the holes of the light source and the chassis; and a base portion having a width larger than the linear portions.

Preferably, the protrusions are formed in such a fashion that adjacent ones of the base portions define a recess sized to accommodate each of the light emitting diodes of the light source.

Preferably, the light guide plate has a length greater than an inner length of the chassis for fixing the light source and the light guide plate.

Preferably, the inner length of the chassis for fixing the light source and the light guide plate corresponds to both a length from a rear end of the light guide plate to the base portions and a thickness of the substrate of the light source.

Preferably, the linear portion of the protrusion has a width smaller than diameters of the holes of the light source and the chassis.

Preferably, the recess of the protrusion has one shape selected from a group consisting of a trapezoid, square and arc.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
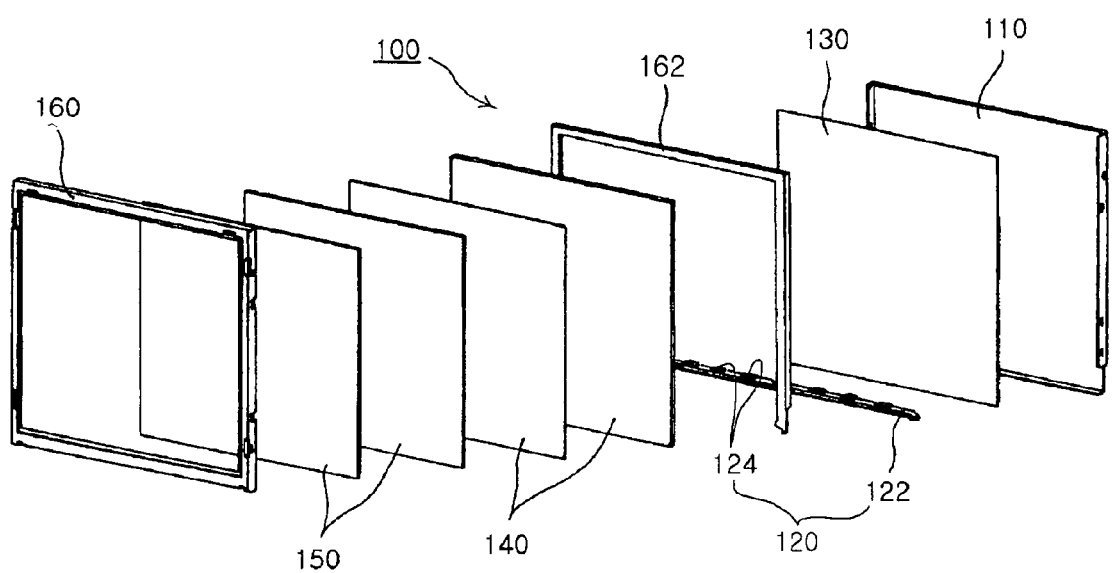
FIG. 1 is an exploded perspective view illustrating a conventional LED back light unit.
Figure 2:
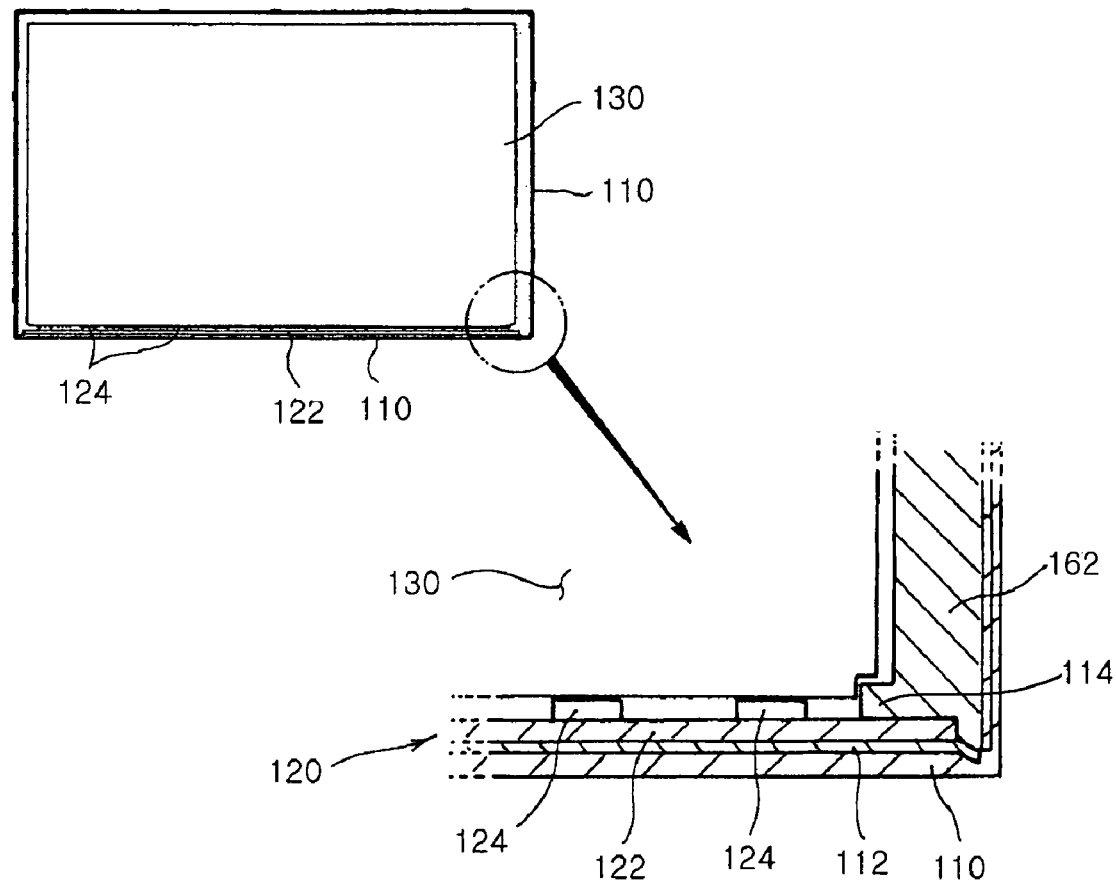
FIG. 2 is a plan view illustrating a conventional LED backlight unit in which a light source is attached to a chassis through a thermosetting adhesive.
Figure 3:
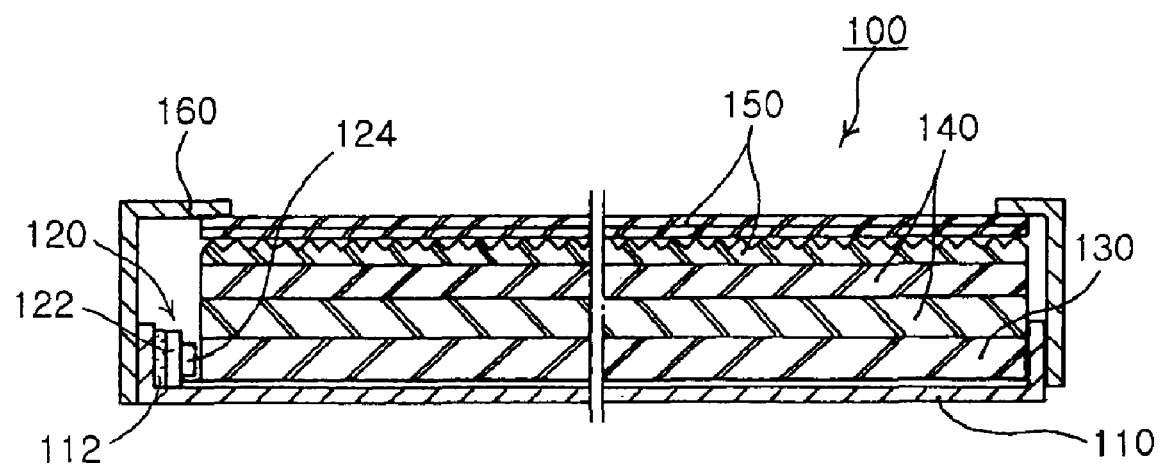
FIG. 3 is a longitudinal cross-sectional view illustrating a conventional LED backlight unit.
Figure 4:
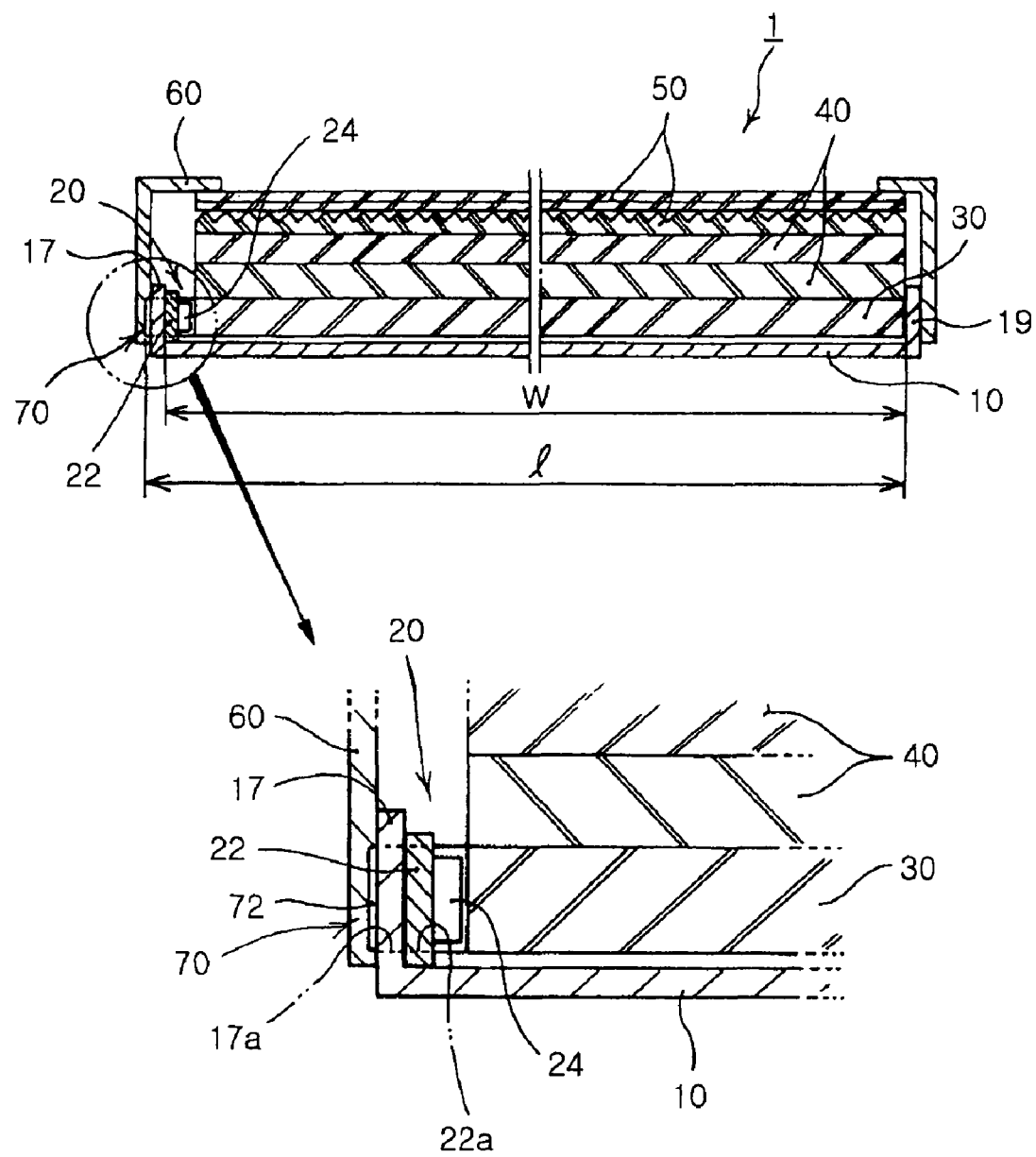
FIG. 4 is a longitudinal cross-sectional view illustrating an LED backlight unit according to the invention.

As shown in FIG. 4, a light emitting diode (LED) backlight unit 1 according to the invention includes a light source having a substrate 22 and a plurality of LEDs 24 disposed on a substrate 22, and a light guide plate 30 placed adjacent to the light source 20.

Also, the LED backlight unit 1 includes a lower chassis 10, a plurality of diffuser plates 40, a plurality of prism plates 50 and a middle chassis 60. The lower chassis 10 fixes the light source 20 and the light guide plate 30 therein. The diffuser plates 40 are disposed over the light guide plate 30 and the prism plates 50 are disposed over the diffuser plates 40. The middle chassis 60 is located to fix the lower chassis 10, the diffuser plates 40 and the prism plates 50.

Further, according to the invention, fixing means 70 are disposed to engagingly fit a side of the light guide plate 30 into the light source 20 and a lower chassis 10. Accordingly, the substrate of the light source 20 is fixed in surface contact with the chassis 10.

Figure 5:
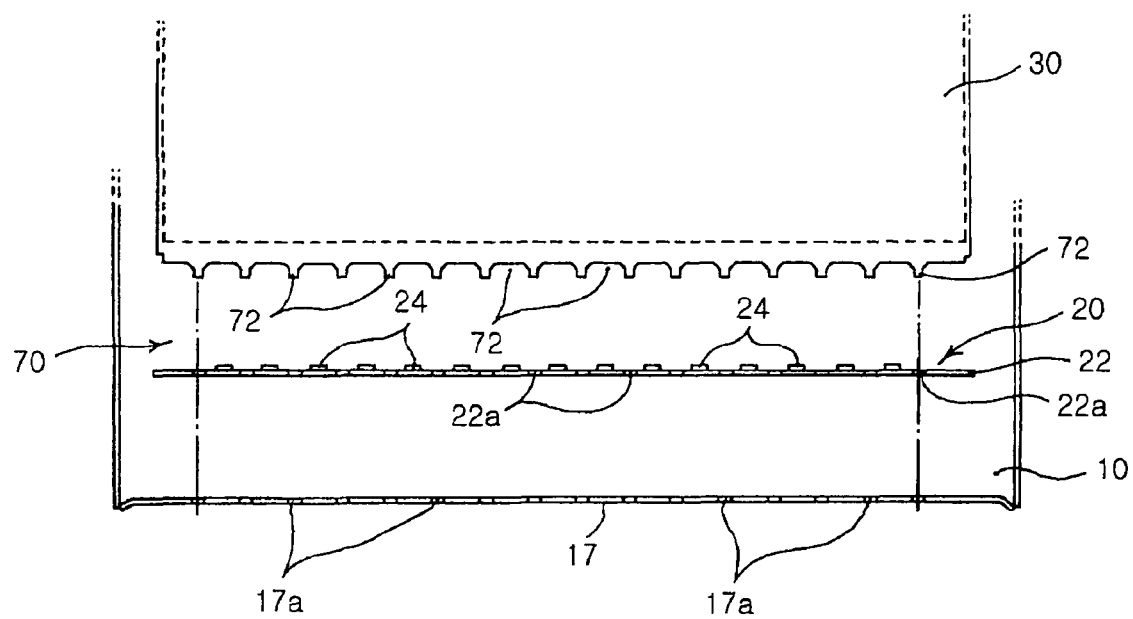
FIG. 5 is a broken apart assembly view illustrating an LED backlight unit where a light source and a light guide plate are combined together according to the invention.

The fixing means 70, as shown in FIG. 5, include a plurality of protrusions 72 protruded from the side of the light guide plate 30, a plurality of holes 22a and 17a perforated in the light source 20 and the lower chassis 10, respectively, corresponding to the protrusions 72.

This structure allows the protrusions 72 of the light guide plate 30 to be inserted into the holes 22a of the light source 20 and the holes 17a of the lower chassis 10, respectively.

Moreover, each of the protrusions 72 includes a linear portion 72a inserted into each of the holes 22a and 17a of the light source 20 and the lower chassis 10, and a base portion 72b having a width larger than the linear portion 72b.

Figure 6:
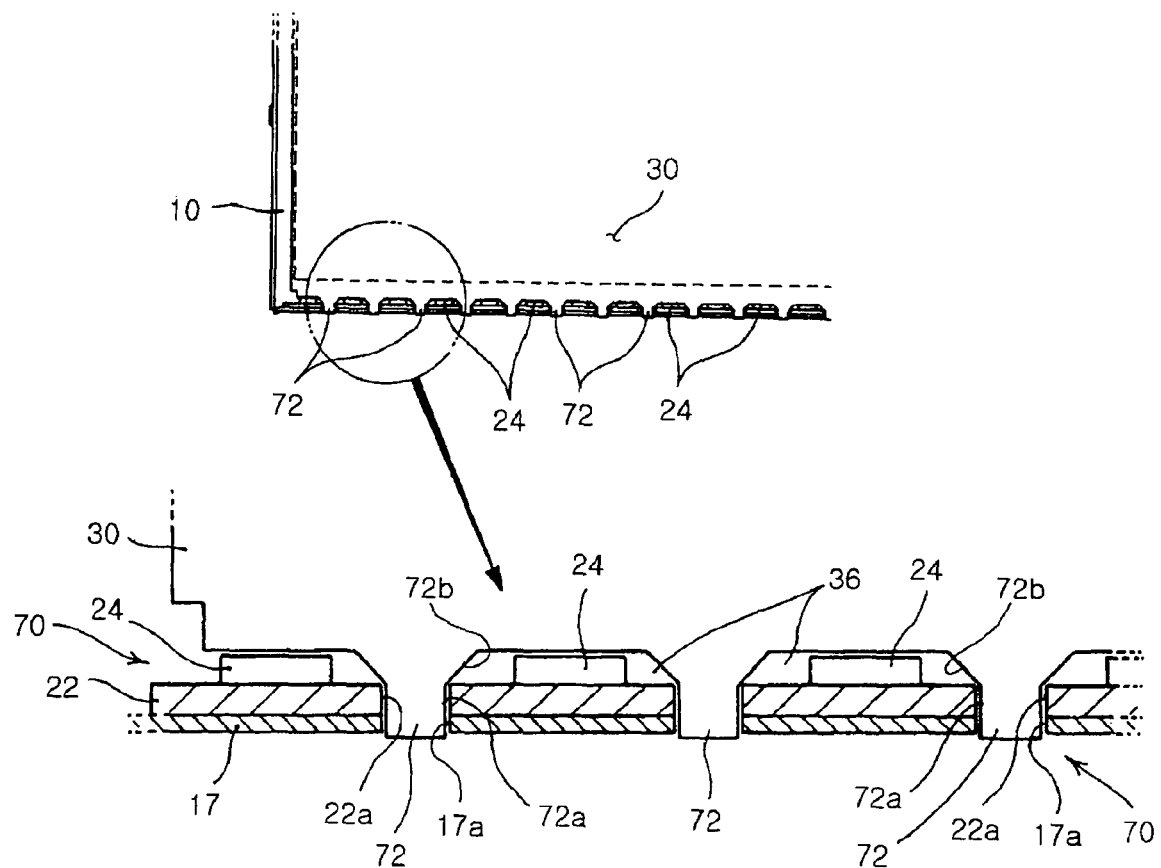
FIG. 6 is a cross-sectional view illustrating an LED backlight unit where a light source, a light guide plate and a chassis are combined together.
Figure 7A:
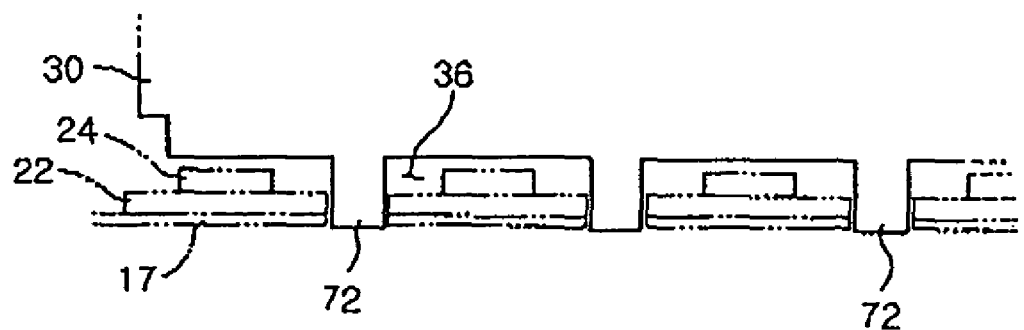
FIGS. 7A and 7B illustrates recesses of FIG. 6 having a shape of a trapezoid, a square and an arc.
Figure 7B:
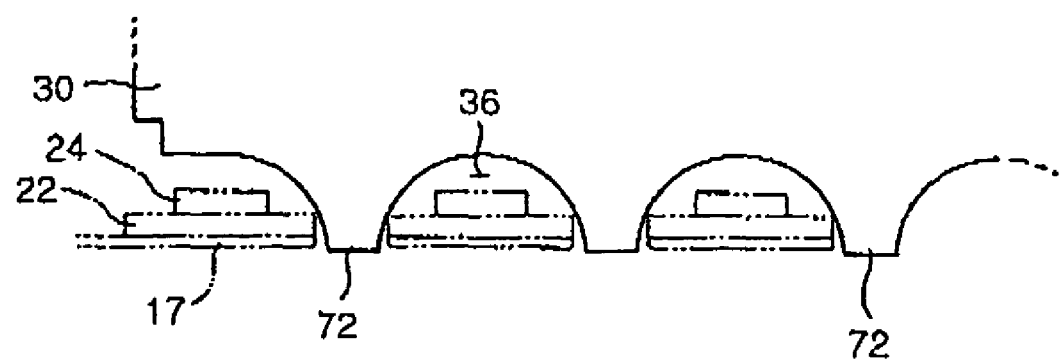

As shown in FIG. 6, the base portion 72b allows only the linear portion 72a of the protrusion 72 to be inserted into each of the holes 22a and 17a of the light source 20 and the lower chassis 10, thereby leaving a recess 36 between the light guide plate 30 and the substrate 22 of the light source 20.

The recess 36 is defined by adjacent ones of the base portions 72b and sized to accommodate each of the LEDs 24 of the light source 20. Therefore, each of the LEDs 24 of the light source 20 is received in the recess 36.

Here, the recess 36 of the protrusion 72 of the light guide plate 30 has one shape selected from a group consisting of a trapezoid, square and arc which defines a space or area where each of the LEDs 24 can be seated stably.

Thus, the LEDs 24 inside the recesses 36 are prevented from being damaged by the light guide plate 30 only when the base portion 72b has a width greater than diameters of the holes 22a and 17a of the substrate and the lower chassis 10. This assures the recesses 36 to be located securely.

Moreover, according to the invention, the light guide plate 30 has a length l greater than an internal length W of the lower chassis 10 for fixing the light source 20 and the light guide plate 30.

As shown in FIG. 4, the lower chassis 10 is provided with front and rear flanges 17 and 19 at both sides thereof, respectively. The rear end of the light guide plate 30 is supported by the rear flange 19 and the substrate 22 of the light source 20 is supported by the front flange 17.

In this structure, the light guide plate 30 has a length l greater than an inner length W of the lower chassis 10 for fixing the light source 20 and the light guide plate 30, i.e., an inner width W between the front and rear flanges 17 and 19. This enables the light guide plate 30 to be engagingly fit into the lower chassis 10.

Furthermore, the inner length w of the lower chassis 10 for fixing the light source 20 and the light guide plate 30 may correspond to both a length from the rear end of the light guide plate 30 to the base portions 72b and a thickness of the substrate 22 of the light source 20.

By virtue of this structure, the linear portions 72a of the protrusions 72 of the light guide plate 30 are inserted into the holes 22a of the substrate of the light source 20, and the holes 17a of the front flange 17 of the lower chassis 10.

As a result, according to the invention, the substrate 22 of the light source 20 is fastened to the lower chassis 10 without the thermosetting adhesive 12. This assembling structure brings a rear end of the substrate 22 into direct surface contact with the lower chassis 10, thereby guaranteeing superior thermal conductivity and heat radiation effects.

Also, the substrate 22, even if slightly warped in a middle portion thereof, can have the warp corrected by the light guide plate 30 during the assembling process and stay fitted to the lower chassis 10.

According to the invention, preferably, the protrusions 72 on the light guide plate 30 are formed in such a fashion that the linear portion 72a of the protrusion 72 has a width smaller than diameters of the holes 22a and 17a of the light source 20 and the lower chassis 10. This structure easily allows the protrusion 72 of the light guide plate 30 to be inserted into each of the holes of the light source 20 and the holes 17a of the lower chassis 10.

The LED backlight unit 1 configured as just described according to the invention does not require the thermosetting adhesive 112 during an assembling process as shown in FIG. 5.

That is, the light source 20 is positioned adjacent to the front flange 17 of the lower chassis 10, and the holes 22a of the substrate of the light source 20 are aligned with the holes 17a of the lower chassis 10. Then, the protrusions 72 of the light guide plate 30 are inserted into the holes 22a and 17a, respectively.

Here, an inner length W of the lower chassis 10 for fixing the light source 20 and the light guide plate 30 corresponds to both a length from the rear end of the light guide plate 30 to the base portion 72b and a thickness of the substrate 22 of the light source 20. Accordingly, the rear end of the light guide plate 30 is supported by the rear flange 19 of the lower chassis 10 and the substrate of the light source 20 is supported by the front flange 17.

Even though the inner length W of the lower chassis 10 for fixing the light source 20 and the light guide plate 30 is slightly smaller than both a length from the rear end of the light guide plate 30 to the base portions 72b and a thickness of the substrate 22 of the light source 20, the front and rear flanges 17 and 19 of the lower chassis 10 can elastically support the light source 20 and the light guide plate 30.

In this structure, the base portion 72b of the light guide plate 30 having a width larger than the diameter of the holes 22a of the substrate 22 cannot be inserted into the holes 22a of the substrate 22 but push the substrate 22 against the front flange 17 of the lower chassis 10. That is, the substrate 22 of the light source 20, even if moderately deformed, is pushed against the front flange 17 of the lower chassis 10 so that the rear side of the substrate 22 is made in flat surface contact with the front flange.

Therefore, heat generated during operation of the light source 20 is radiated outside from the substrate 22 through the lower chassis 10 without difficulty since the substrate 22 is in surface contact with the lower chassis 10 made of a metal material. This also ensures very excellent heat radiation effects.

These superior heat radiation effects prevent the LEDs 24 of the light source 20 from generating heat which otherwise may degrade brightness during the operation thereof. This accordingly assures high brightness without hampering performance of the light source 20.

After disposing the light source 20 and the light guide plate 30 on the lower chassis 10, the diffuser plates 40 are disposed over the light guide plate 30 and the prism plates 50 are disposed over the diffuser plates 40. Here, the lower chassis 10, the diffuser plates 40 and the prism plates 50 are fixed by the middle chassis 60.

In this assembling process as described above, the invention does not employ the thermosetting adhesive 112, thereby not causing any smear problem of the adhesive 112 on the LEDs 24. This precludes occurrence of defects in the LEDs. Moreover, the invention is assembled by fitting, thereby facilitating the assembling process and noticeably enhancing productivity.

Meanwhile, according to the invention, the recess 36 of the protrusion 72 of the light guide plate 30 has one shape selected from a group consisting of a trapezoid, square and arc which defines a space or area where each of the LEDs 24 of the light source 20 can be seated stably.

The recess 36 may be shaped in whatever form necessary to obtain desired brightness in the LED backlight unit 1 of the invention. Thus, the recess of the invention is not limited to a specific shape.

Moreover, the invention obviates a need for a conventional attachment, i.e., a separate attachment 114 for separating the light guide plate 30 from the LEDs 24 of the light source thanks to the protrusions 72 formed on the light guide plate 30. This consequently simplifies structure of the lower chassis 10.

As set forth above, according to exemplary embodiments of the invention, a light guide plate is assembled without use of a thermosetting adhesive, thereby facilitating an assembling process and productivity.

Also, according to the invention, a substrate of a light source is in direct surface contact with a chassis, thereby free from any obstacle to a heat transfer path. This as a result allows heat generated from LEDs to be radiated outside effectively, thereby maintaining high brightness and superb light emitting capability.

While the present invention has been shown and described in connection with the preferred embodiments, it will be apparent to those skilled in the art that modifications and variations can be made without departing from the spirit and scope of the invention as defined by the appended claims.

What is claimed is:

1. A light emitting diode backlight unit including light guide plate comprising:
   a light source having a substrate and a plurality of light emitting diodes disposed on the substrate, the substrate having a plurality of holes located between the plurality of light emitting diodes;
   a light guide plate, placed adjacent one side of the substrate, having a plurality of protrusions protruding from the light guide plate toward the light source;
   a chassis, disposed adjacent the opposite side of the substrate, for fixing the light source and the light guide plate therein, the chassis having a plurality of holes;
   wherein the protrusions of the light guide plate are inserted into the holes of the substrate and the chassis, respectively such that the substrate of the light source is fastened to the chassis and fixed in surface contact with the chassis, and a side of the light guide plate is engagingly fitted into the substrate of the light source and the chassis,
   wherein the light guide plate with its protrusions has a length greater than an inner length of the chassis for fixing the light source and the light guide plate.

2. The light emitting diode backlight unit including light guide plate according to claim 1, wherein the inner length of the chassis for fixing the light source and the light guide plate corresponds to the addition of a length from a rear end of the light guide plate to the base portions and a thickness of the substrate of the light source.

3. The light emitting diode backlight unit including light guide plate according to claim 1, wherein each of the protrusions comprises:
   a linear portion inserted into each of the holes of the light source and the chassis; and
   a base portion having a width larger than the width of the linear portions.

4. The light emitting diode backlight unit including light guide plate according to claim 3, wherein the linear portion of the protrusion has a width smaller than diameters of the holes of the light source and the chassis.

5. The light emitting diode backlight unit including light guide plate according to claim 3, wherein the protrusions are formed in such a fashion that two adjacent base portions of the protrusions define a recess sized to accommodate each of the light emitting diodes of the light source.

6. The light emitting diode backlight unit including light guide plate according to 5, wherein the recess defined by the protrusions has one shape selected from a group consisting of a trapezoid, square and arc.

7. A light emitting diode backlight unit including light guide plate comprising:
- a light source having a substrate and a plurality of light emitting diodes disposed on an upper surface of the substrate, the substrate having a plurality of holes located between the plurality of light emitting diodes;
- a light guide plate placed adjacent the upper surface of the substrate, the light guide plate having a plurality of protrusions extending in the direction of the upper surface of the substrate;
- a chassis, placed adjacent the lower surface of the substrate, for fixing the light source and the light guide plate therein, the chassis having a plurality of holes located in areas corresponding to the plurality of holes of the substrate,
- wherein the plurality of protrusions of the light guide plate are inserted to the plurality of holes of the substrate and the plurality of holes of the chassis such that the light guide plate is fastened to the substrate and the chassis.

8. The light emitting diode backlight unit of claim 7, wherein the light guide plate has a plurality of recesses between the plurality of protrusions, and the plurality of light emitting diodes are housed inside the plurality of recesses.

* * * * *